United States Patent [19]
Scaringe et al.

[11] Patent Number: 5,647,226
[45] Date of Patent: Jul. 15, 1997

[54] PHASE CHANGE APPARATUS FOR ANIMAL PARTS, HUMAN BODY PARTS, BODY FLUIDS AND CULTURE

[75] Inventors: Robert P. Scaringe, Rockledge; Lawrence R. Grzyll, Merritt Island, both of Fla.

[73] Assignee: Mainstream Engineering Corporation, Rockledge, Fla.

[21] Appl. No.: 661,929

[22] Filed: Jun. 11, 1996

Related U.S. Application Data

[63] Continuation of Ser. No. 350,490, Dec. 7, 1994.

[51] Int. Cl.$^6$ .................................................. F25D 3/08
[52] U.S. Cl. ........................... 62/457.2; 62/530; 62/371
[58] Field of Search .......................... 62/371, 457.1, 62/457.2, 529, 530, 457.7

[56] References Cited

U.S. PATENT DOCUMENTS

| | | |
|---|---|---|
| 2,403,676 | 7/1946 | Modlinski . |
| 3,607,591 | 9/1971 | Hansen . |
| 3,913,559 | 10/1975 | Dandliker . |
| 4,575,097 | 3/1986 | Brannigan et al. . |
| 4,756,958 | 7/1988 | Bryant et al. . |
| 4,856,294 | 8/1989 | Scaringe et al. ........................ 62/259.3 |
| 5,111,668 | 5/1992 | Parrish et al. ........................ 62/259.3 |
| 5,113,666 | 5/1992 | Parrish et al. ........................ 62/259.3 |

OTHER PUBLICATIONS

Order Granting/Denying Request for Reexamination dated Dec. 1, 1995 from the PTO, 3 pages.
Request for Reexamination Transmittal filed on Oct. 6, 1995 with Reexamination Requester's Statement Pursuant to 37 C.F.R. § 1.510(b) (25 pages), PTO 1449, U.S. Pat. No. 4,856,294 (13 pages), and Listing of Attachments to Reexamination Requester's Statement (2 pages).
The SteeleVest, A Practical Body Cooling System, New Equipment Digest, Aug. 1987, 3 pages.

*Primary Examiner*—William Doerrler
*Attorney, Agent, or Firm*—Evenson, McKeown, Edwards & Lenahan, P.L.L.C.

[57] ABSTRACT

Phase-change materials are used to preserve temperature-sensitive items such as biological specimens without subjecting the latter to extreme heat or extreme cold. Such use provides active thermal control due to melting and solidification of the phase-change materials at constant temperature.

7 Claims, 1 Drawing Sheet

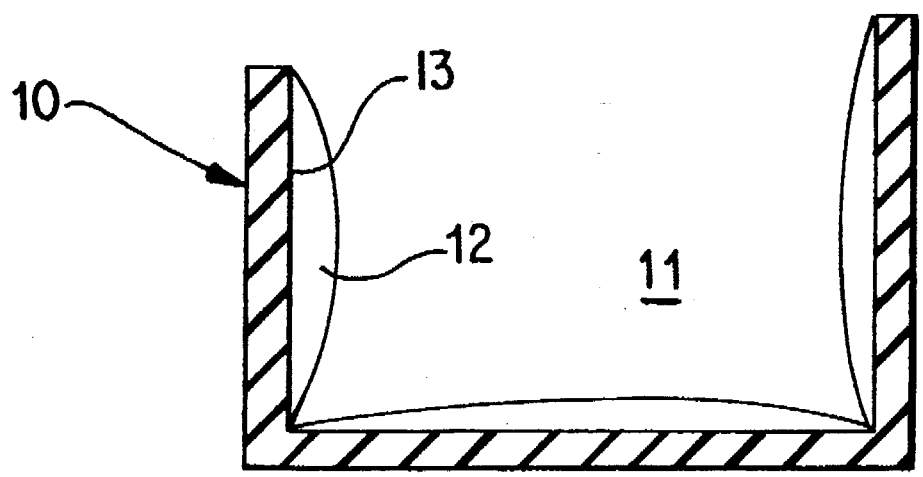

PHASE CHANGE APPARATUS FOR ANIMAL PARTS, HUMAN BODY PARTS, BODY FLUIDS AND CULTURE

This application is a continuation of application Ser. No. 08/350,490, filed on Dec. 7, 1994.

BACKGROUND AND SUMMARY OF THE INVENTION

The present invention relates to a method for using a phase-change material for preserving animal and human body parts, biological cultures and the like. More particularly, the present invention relates to a new method for using the phase change materials of the type disclosed on U.S. Pat. No. 4,856,294, incorporated by reference herein, such that extremely temperature sensitive specimens are adequately protected via multi-phase cooling using latent heat.

Prior to the use of multi-phase change materials described in the aforementioned U.S. patent for personal cooling systems, it was common to use cold water pumped through pipes in a vest. Among the several disadvantages of using cold water was that the water was considerably colder than the desired skin temperature. This, in turn, caused discomfort for the wearer of the vest. By using a multi-phase-change material, the inventors maintained the temperature cooling action for a living human being within a practical and comfortable range. Other types of phase change material garments are disclosed in U.S. Pat. Nos. 5,111,668 and 5,113,666.

We have now recognized that other things, namely extremely sensitive temperature sensitive specimens such as medical specimens, bacteria, biological cultures and body parts which often have to be shipped long distances, can be ruined from excessive cold or heat. Thus, ice cannot be used in this application because it produces an undesirably low temperature in addition to being undesirably heavy. The conventional approach has been to use chilled water cooled to about 50° F. along with insulation. This is the so-called single phase cooling approach which has limited cooling ability because only "sensible" cooling (that is, mCpΔT) is used. It also is undesirably heavy due to the weight of water.

We have now discovered that the phase-change materials disclosed in above-referenced U.S. Pat. No. 4,856,294 provide a substantially improved technique for maintaining living tissue, medical specimens and cultures at the appropriate temperature.

A major advantage of using such material in accordance with the present invention is that it does not allow container contents to become too hot or too cold.

Another advantage of the present invention is that the new use of particular phase-change materials allows exploitation of latent heat occurring from solid-liquid phase change. For example, sensible heating from 50° F. to 70° F. is only 20 BTU/lb with single phase cooling whereas latent heat at 65° is 101 BTU/lb or about five times the cooling capacity available via single phase cooling.

Still a further advantage of using a phase-change material is that the phase change material will also provide active thermal control in contrast to single phase sensible heating. The thermal control is available due to the nature of phase change materials, because the phase change material melts or solidifies at a constant temperature. Therefore, if cooling is required, (e.g., the ambient temperature in the container is warmer than the surroundings), the phase change material will melt, thereby absorbing heat from the surroundings and providing cooling. Likewise, if there is heating required (e.g., the ambient temperature is colder than the surroundings), the phase change material will solidify, thereby rejecting heat to the surroundings and providing heating.

The new use which we have recognized for such phase change materials is thus ideal for the shipment of perishable, temperature sensitive items such as human and animal organs, blood plasma, body parts, biological cultures, and bacteria which have to be shipped long distances (air shipments) and are extremely temperature sensitive.

BRIEF DESCRIPTION OF THE DRAWING

Other objects, features and advantages of the present invention will become more apparent from the following detailed description thereof when taken in conjunction with the accompanying sole figure which is a schematic diagram of a shipping container incorporating the phase change material for effecting the new use thereof.

DETAILED DESCRIPTION OF THE DRAWING

A shipping container is designated generally by the numeral 10 and can take the form, for example, of a cardboard box or wooden crate. The interior 11 of the box 10 is provided with pouches 12 of one of the phase-change materials identified on Table I below:

TABLE I

| Type of Material | Phase Change Temperature |
| --- | --- |
| n-Tetradecane | 42.5° F. |
| 1-Decanol | 45.2° F. |
| n-Pentadecane | 49.9° F. |
| Chloroacetic acid-o-Cresol eutectic | 60.4° F. |
| Tetradecylbenzene | 60.8° F. |
| Sodium Chromate Decahydrate | 61° F. |
| n-Octanoic Acid | 61.3° F. |
| chloroacetic acid-phenol eutectic | 61.7° F. |
| Acetic Acid | 61.9° F. |
| Salt mixture of 37% $NaSO_4$, 17% NaCl, 46% $H_2O$ | 64° F. |
| 1-Octadecene | 64.2° F. |
| Glycerol | 64.4° F. |
| n-Hexadecane | 64.8° F. |
| Polyethylene Glycol 600 | 68–77° F. |
| Double Clathrate of water with Tetrahydrofuran and Hydrogen Sulfide | 70° F. |
| Lithium Chloride ethanolate | 70° F. |
| n-heptadecane | 71° F. |
| Copper Nitrate Hexahyrate | 79° F. |
| Lactic Acid | 79° F. |
| Manganous Nitriate Hexahydrate | 79° F. |
| n-Octadecane | 82° F. |
| Methyl Palmitate | 84° F. |
| 3-Methylpentacosane | 84° F. |
| Orthophosphoric Acid Hemihydrate | 85° F. |
| Lithium Nitrate Trihydrate | 86° F. |
| Calcium Chloride Hexahydrate | 86° F. |
| Gallium | 86° F. |
| Sodium Solfate Decahydrate | 90° F. |
| Levulinic Acid | 95 F. |
| n-Eicosane | 97.6° F. |
| Sun Wax P-116 | 116° F. |

An insulation layer 13, such as foam, can be fabricated between the outer surface of the container 10 and the layer 13 of phase-change material to shield at low cost, the contents of the container at ambient temperature from surrounding conditions and thereby reduce the needed cooling or heating by the phase-change pouches 12 which can be provided on all six sides of the container 10.

EXAMPLE 1

In an 18" square cardboard box with 2" of foam insulation on the inside of the box, at a 105° F. ambient air temperature, the present invention should maintain the internal temperature at 65° F. for 24 hours with only 6.5 pounds of phase change material. The set point temperature, namely the phase change temperature, can be set at virtually any temperature between 40° and 135° F. using the above identified phase change materials. Likewise, 48 hours of cooling should be obtainable for 13.0 pounds of phase change material. Of course, longer times or less insulation increases the amount of phase change material needed in a linear fashion. That is, twice the time, twice the cooling material needed; twice the insulation; and half the cooling material needed.

COMPARATIVE EXAMPLE

Sensible cooling with chilled water requires an undesirable temperature swing of the contents and 5-times the mass of material (or five times the thickness of insulation). For an 18" square box, if the initial contents and the "cooling" water could be acceptably chilled to 50° F., and the contents could acceptably be warmed to 70° F., the chilled water approach would still require five-times the mass (and approximately 4-times the volume) of water to be packaged in the box. Therefore for 2" of insulation, to provide cooling for 24 hours, should require 3.25 pounds of material in the 18" square box. For that size box, after accounting for the space used by the insulation, there is 1.58 cubic feet of space remaining for the cooling water and the contents. The "cooling" water would occupy 0.52 cubic feet or 33% of the available space. The above-identified phase change materials, however, would only occupy 0.13 cubic feet of space or 8% of the available space while providing significantly improved thermal control to prevent overheating and overcooling (freezing).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A use of a phase-change material for maintaining in a container an at least one temperature sensitive item at a preselected temperature as close as possible to ambient temperature to minimize heat transfer with respect to the ambient temperature without causing any temperature-related damage to the at least one item.

2. The use according to claim 1, wherein the at least one item is selected from the group consisting of animal parts, human body parts, body fluids and biological cultures.

3. The use according to claim 1, wherein the phase-change material is selected from a group consisting of:
n-Tetradecane
1-Decanol
n-Pentadecane
Chloroacetic acid-o-Cresol eutectic
Tetradecylbenzene
Sodium Chromate Decahydrate
n-Octanoic Acid
chloroacetic acid-phenol eutectic
Acetic Acid
Salt mixture of 37% NaSO$_4$,
17% NaCl, 46% H$_2$O
1-Octadecene
Glycerol
n-Hexadecane
Polyethylene Glycol 600
Double Clathrate of water with Tetrahydrofuran and Hydrogen Sulfide
Lithium Chloride ethanolate
n-heptadecane
Copper Nitrate Hexahyrate
Lactic Acid
Manganous Nitriate Hexahydrate
n-Octadecane
Methyl Palmitate
3-Methylpentacosane
Orthophosphoric Acid Hemihydrate
Lithium Nitrate Trihydrate
Calcium Chloride Hexahydrate
Gallium
Sodium Solfate Decahydrate
Levulinic Acid
n-Eicosane
Sun Wax P-116.

4. A method of using a phase-change material, comprising the steps of
 (a) lining a container with the phase-change material, selected to have a phase-change temperature as close as possible to ambient temperature to minimize heat transfer with respect to the ambient temperature without causing any temperature-related damage to contents of the container;
 (b) placing at least one temperature-sensitive item constituting the contents inside the container; and
 (c) sealing the container to insulate an interior thereof from ambient temperature.

5. The method according to claim 4, wherein the phase-change material is selected from a group consisting of:
n-Tetradecane
1-Decanol
n-Pentadecane
Chloroacetic acid-o-Cresol eutectic
Tetradecylbenzene
Sodium Chromate Decahydrate
n-Octanoic Acid
chloroacetic acid-phenol eutectic
Acetic Acid
Salt mixture of 37% NaSO$_4$,
17% NaCl, 46% H$_2$O
1-Octadecene
Glycerol
n-Hexadecane
Polyethylene Glycol 600
Double Clathrate of water with Tetrahydrofuran and Hydrogen Sulfide
Lithium Chloride ethanolate
n-heptadecane
Copper Nitrate Hexahyrate
Lactic Acid
Manganous Nitriate Hexahydrate
n-Octadecane
Methyl Palmitate 3-Methylpentacosane
Orthophosphoric Acid Hemihydrate
Lithium Nitrate Trihydrate
Calcium Chloride Hexahydrate
Gallium
Sodium Solfate Decahydrate
Levulinic Acid
n-Eicosane
Sun Wax P-116.

6. The method according to claim 4, wherein the at least one item is selected from the group consisting of animal parts, human body parts, body fluids and biological cultures.

7. The method according to claim 5, wherein the at least one item is selected from the group consisting of animal parts, human body parts, body fluids and biological cultures.

* * * * *